INVENTOR.
WM. R. KEOUGH.
BY
SETTLE, BATCHELDER & OLTMAN.
ATT'YS.

May 19, 1970     W. R. KEOUGH     3,512,628
WALKING BEAM CONVEYOR AND METHOD
Filed July 9, 1968                     2 Sheets-Sheet 2

INVENTOR.
WILLIAM R. KEOUGH.
BY
SETTLE, BATCHELDER & OLTMAN.

ATT'YS.

United States Patent Office 3,512,628
Patented May 19, 1970

3,512,628
WALKING BEAM CONVEYOR AND METHOD
William R. Keough, Birmingham, Mich., assignor of forty-five percent to Multifastener Company, Detroit, Mich., a partnership
Filed July 9, 1968, Ser. No. 743,482
Int. Cl. B65g 25/04
U.S. Cl. 198—219                                   7 Claims

ABSTRACT OF THE DISCLOSURE

A walking beam conveyor and method of conveying is disclosed wherein a movable beam is reciprocated both vertically and horizontally so that it follows a square path to shift workpieces step-by-step along fixed rail means. The rail means may be in a furnace, and if so, the movable beam indexes the workpieces through the furnace. The movable beam is directly reciprocated horizontally by power means, and it is reciprocated vertically by a separate horizontally reciprocated member through a cam and follower coupling.

Background of the invention

Conveyors of the well known continuous type wherein a belt, chain, web or the like is employed are not well suited for transporting very heavy workpieces, particularly where the workpieces are to be conveyed through a high temperature furnace as for heat treatment purposes. In order to minimize heat losses from such furnaces, it is desirable to convey the workpieces on refractory material, but it would be difficult and expensive to construct a continuous conveyor of refractory material.

As an alternative, reciprocating type conveyors have been proposed wherein a first beam or rail structure of refractory material picks up workpieces from a second beam or rail structure, also of refractory material, moves the workpieces longitudinally a short distance, and then redeposits them on the second beam. The second beam may also move, or it may be stationary. One drawback of known reciprocating conveyors has been that the mechanism for driving the beam or beams has been unduly complicated, and not sufficiently reliable.

Summary of the invention

The present invention provides a reciprocating conveyor including a walking beam which follows a square path in picking up workpieces from a fixed rail, transporting them ahead, depositing them on the rail, and retracting to the starting point. This simple motion is provided by horizontally reciprocating the working beam directly by a power means, and vertically reciprocating the beam by a separate horizontally reciprocated member through a cam and follower coupling. In a preferred embodiment, a power cylinder reciprocates the walking beam horizontally. Profile cams each including a ramp extending between horizontal surfaces at both ends thereof are provided on the walking beam or its support, and rollers on the separate member ride along the cam surfaces as the separate member is horizontally reciprocated. As the rollers ride on the ramps of the cams, the beam is vertically reciprocated. As the beam is directly horizontally reciprocated by its associated power means, the rollers ride on the horizontal surfaces of the cams. In this way, the desired square motion is imparted to the walking beam. The invention also includes the method of conveying.

Accordingly, it is an object of the present invention to provide a walking beam conveyor and method of conveying in which a movable beam follows a square path relative to a fixed rail.

Another object of the invention is to provide a simple and reliable driving device for a walking beam conveyor.

A further object of the invention is to provide a walking beam in a conveyor with power means for horizontally reciprocating the same, and a separate horizontally reciprocated member coupled to the beam by cams and cam followers for vertically reciprocating the beam.

A further object of the invention is to provide each of the cams just referred to with a ramp for effecting the vertical reciprocation of the beam, and a horizontal surface at each end of the ramp for accommodating the horizontal reciprocation of the beam.

Still another object of the invention is to provide a cam type coupling for a walking beam wherein a wheel rides on a ramp to raise the beam and then rides along a horizontal surface, all while a drive member is moved horizontally in one direction, rides back on the horizontal surface while the beam is advanced horizontally, rides reversely on the ramp to lower the beam and rides along a second horizontal surface while the drive member is retracted, and rides back to the beginning of the ramp while the beam is retracted.

Other objects of this invention will appear in the following description and appended claims, reference being had to the accompanying drawings forming a part of this specification wherein like reference characters designate corresponding parts in the several views.

On the drawings

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein it for the purpose of description and not of limitation.

As shown on the drawings

Figure 1:
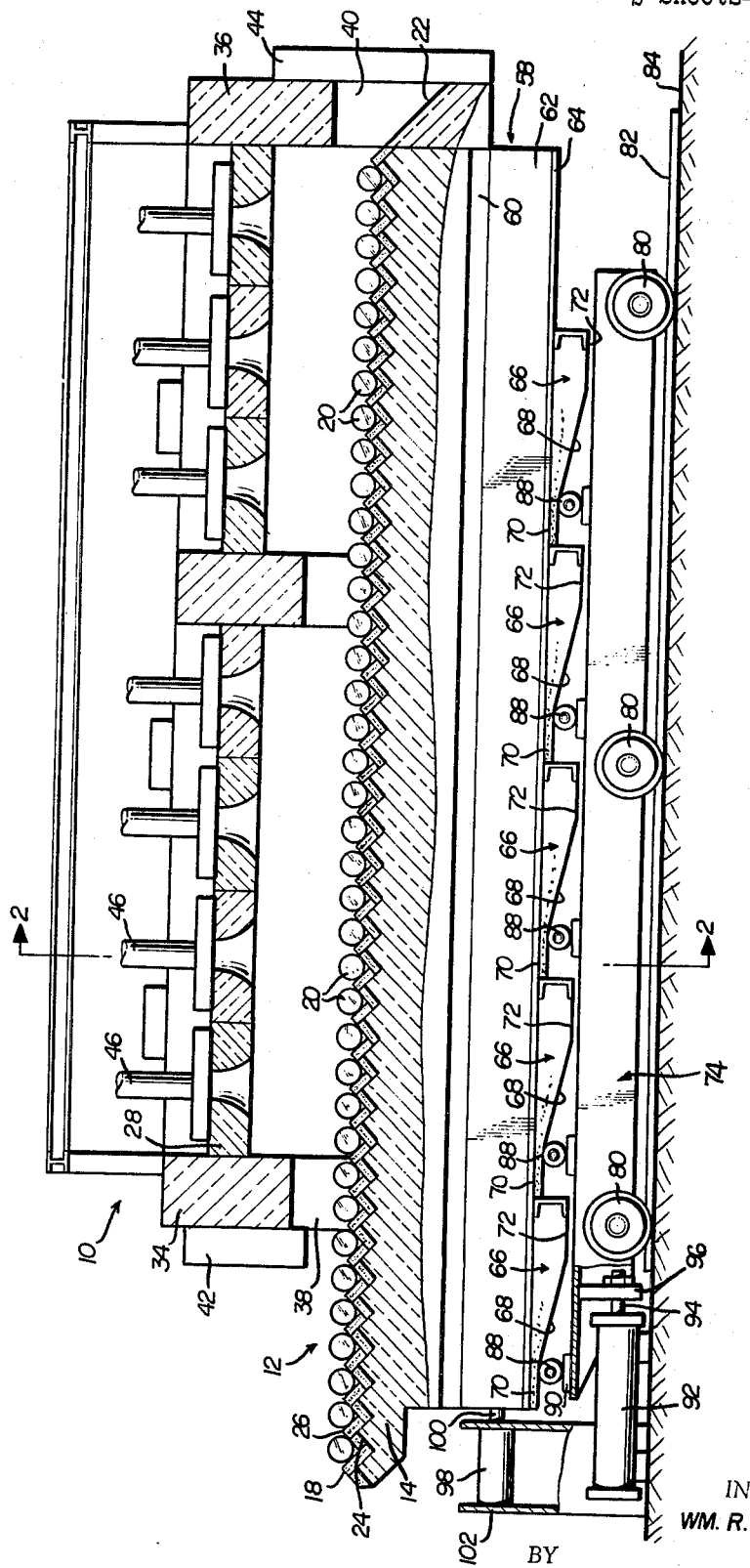
FIG. 1 is a vertical sectional view of a furnace provided with a walking beam conveyor in accordance with one embodiment of the invention.
Figure 2:
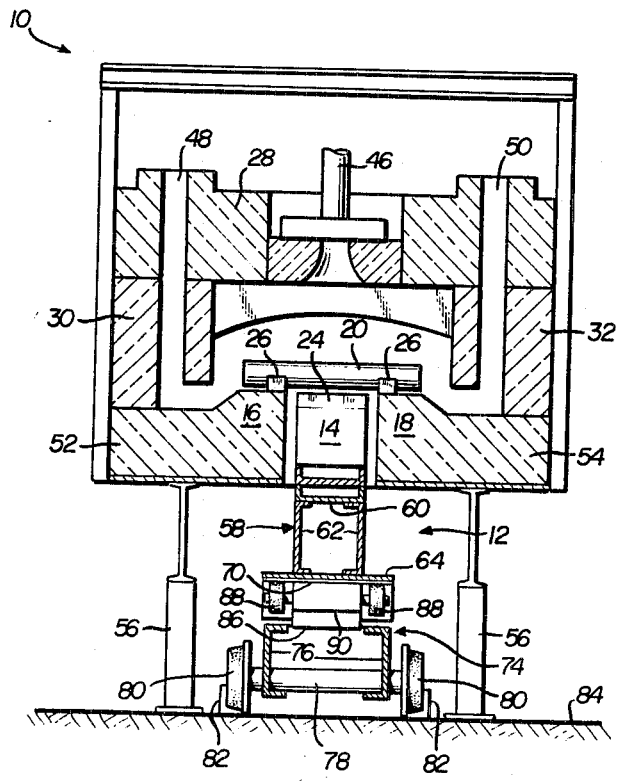
FIG. 2 is a cross sectional view of the furnace and conveyor taken along line 2—2 of FIG. 1.
Figure 3:
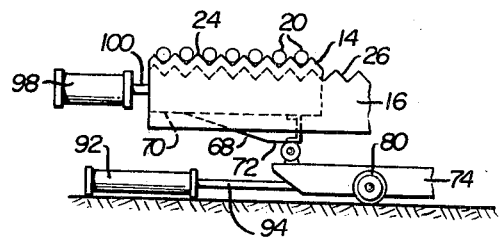
FIG. 3 is a fragmentary view of a portion of the conveyor illustrating a first step in the operation of the conveyor.

The furnace 10 shown in FIGS. 1 and 2 is provided with a reciprocating type conveyor 12, sometimes referred to herein as a walking beam conveyor, which includes a movable walking beam 14 and two fixed rails 16 and 18 on opposite sides of the walking beam 14 (FIG. 2). The walking beam 14 is shown in a lowered position relative to the rails 16 and 18. Beam 14 and also rails 16 and 18 are made of refractory material so that they do not conduct or transfer excessive amounts of heat from the furnace 10. Beam 14 and rails 16 and 18 are used to convey or transport workpieces 20 through the furnace, the workpieces being shown in the condition where they rest on rails 16 and 18 in FIGS. 1 and 2. An ordinary conveyor may be used to transport the workpieces 20 to the reciprocating conveyor 12, and likewise an ordinary conveyor may be used to transport the workpieces away from the reciprocating conveyor 12 after the workpieces leave the furnace 10. An inclined surface 22 may be provided on rails 16 and 18 to discharge the workpieces on to the exit conveyor. The movable beam 14 has a serrated upper surface 24, and likewise rails 16 and 18 have serrated upper surfaces 26. The workpieces 20 rest in the notches of the serrated surfaces, and they are transported step-by-step one notch at a time along the serrated surfaces 26 by the movable beam 14 as will be explained further.

The furnace may be of any suitable construction. The furnace illustrated herein includes an upper refractory wall 28, side walls 30 and 32, and end walls 34 and 36. Openings 38 and 40 are provided respectively in the end walls 34 and 36, and these openings may be closed by means of doors 42 and 44. Conduits 46 extend through the upper wall 28 for supplying heated gas to the interior of the furnace, and outlet passages 48 and 50 are provided in side walls 30 and 32 and upper wall 28 for allowing removal of gas from the furnace.

The fixed rails 16 and 18 are formed on longitudinally extending members 52 and 54. The entire furnace may be supported above a floor by posts 56.

The rails 16 and 18 are really parts of the reciprocating conveyor 12, but in connection with the furnace application being described, they are incorporated into the furnace. The movable beam 14 is carried on a support structure 58 which includes a metal structural member 60 supported on two channel members 62. The latter channel members are affixed to a plate 64.

Affixed to the underside of plate 64 are a series of cam structures 66, each of which includes an inclined ramp surface 68. There is a first horizontal surface 70 at the upper end of each ramp 68, and a second horizontal surface 72 at the lower end of each ramp.

Disposed below the cams 66 is a carriage 74 which in this embodiment is comprised of a pair of channel members 76 interconnected by suitable bracing axles 78 mounted for rotation on the channel members, and wheels 80 which ride on tracks 82 mounted on the floor 84. The tracks are arranged such that carriage 74 is adapted to be reciprocated longitudinally directly under and parallel to support structure 58.

Mounted on a top member 86 of carriage 74 are a series of cam follower rollers 88, the rollers being journaled for rotation in suitable trunnions 90. Each of the rollers 88 engages a respective one of the cams 66 and is positioned so as to ride on the surfaces 68, 70 and 72 of the respective cam.

A first power cylinder 92 is mounted on the floor 84 and has a piston 94 connected to a bracket 96 on carriage 74. Power cylinder 92 may be of the hydraulic or pneumatic type. A second power cylinder 98 having a piston 100 connected to support structure 58 is mounted on a stand 102 in a manner such that cylinder 98 can move vertically with support structure 58. Power cylinder 98 is adapted to reciprocate beam 14 horizontally, and and power cylinder 92 is adapted to reciprocate carriage 74 horizontally.

The operation of the apparatus will be described with reference to FIGS. 1–5 starting in the condition wherein the rollers 88 are located at the top of the ramps 68 shown in FIG. 1. First, the power cylinder 92 is actuated to extend piston 94 and thereby move the carriage 74 to the right to the position shown in FIG. 3. During this movement, the rollers 88 ride along ramps 68 to thereby push support structure 58 and beam 14 vertically upward so that the workpieces 20 are picked up by the serrated surface 24 of beam 14. During the final portion of the stroke of piston 94, the wheels 88 ride horizontally along horizontal surfaces 72 of cams 66 to the position shown in FIG. 3. Thus, the first leg of the motion of beam 14 is vertical.

Figure 4:
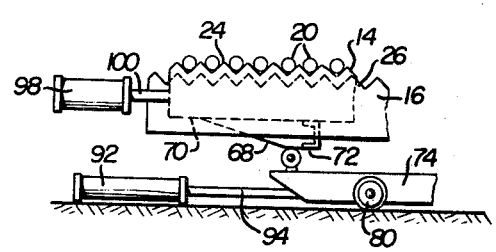
FIG. 4 is a fragmentary view similar to FIG. 3 illustrating the second step in the operation of the conveyor.
Figure 5:
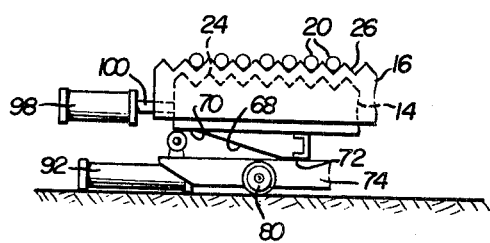
FIG. 5 is a fragmentary view illustrating the third step in the operation of the conveyor, the fourth and final step being merely to return the conveyor to the condition shown in FIG. 1.

Next, the power cylinder 98 is actuated to extend piston 100 and thereby push support structure 58 and beam 14 horizontally to the right to the position shown in FIG. 4. During this motion, wheels 88 ride on the horizontal surfaces 72 as those surfaces move to the right until the wheels are located at the bottom of ramps 68 as shown in FIG. 4. Thus, the second leg of the motion of beam 14 is horizontal.

The power cylinder 92 is then actuated in the reverse sense to withdraw piston 94 and thereby pull carriage 74 to the left. The wheels 88 roll along the ramps 68, thus allowing support structure 58 and beam 14 to move vertically downward to the position shown in FIG. 5. During this motion, the workpieces 20 are deposited on the serrated surface 26 of rails 16 and 18 one notch to the right of their respective positions at the beginning of the cycle. During the final portion of the reverse stroke of piston 94, the rollers 88 ride horizontally to the left along the upper horizontal surfaces 70 of the cams 66 to the position shown in FIG. 5. Thus, the third leg of the motion of beam 14 is vertically downward.

Finally, power cylinder 98 is actuated in the reverse sense to retract piston 100 and thereby directly pull support structure 58 and beam 14 to the left back to the position shown in FIG. 1. During this motion, the wheels 88 ride on horizontal surfaces 70 as those surfaces move to the left until the rollers 88 are again located at the upper ends of the ramps 68 as shown in FIG. 1. The final leg of the movement of beam 14 is thus horizontally to the left.

It is apparent from the foregoing description that the driving mechanism including carriage 74, rollers 88 and cams 66 is effective to move beam 14 along a square path. The term square as used herein is intended to include a rectangular path. The workpieces 20 are picked up and later redeposited as the beam 14 is moving completely vertically. That is, there is no horizontal component of motion of the beam 14 as it picks up the workpieces and later redeposits them relative to the rails 16 and 18. As a consequence, there is a minimum of impact on the workpieces when they are picked up and redeposited.

The reciprocal conveyor described above employs relatively few movable parts, and those parts which are movable can be conditioned to resist wear. The driving structure is relatively simple and can be constructed economically. As a result of the square path of movement of the movable beam, and since the beam can be raised and lowered relatively slowly in completely vertical directions, there is little impact on the workpieces 20 as they are raised and lowered, thus minimizing the risk of damage to them. The movable beam 14 and the fixed rails 16 and 18 can conveniently be made of refractory material so as to minimize heat losses from the furnace.

Having thus described my invention, I claim:

1. A reciprocating conveyor comprising, elongated support means for supporting workpieces to be transported along said support means longitudinally thereof, movable beam means parallel to and closely spaced from said support means for lifting workpieces from said support means and moving the workpieces a relatively short distance along said support means and depositing the workpieces on said support means, a movable carriage carrying said beam means and movable horizontally relative thereto, cam means and cam follower means providing a coupling between said beam means and said carriage, said cam means including an inclined ramp surface and a horizontal surface at each end thereof, each of said horizontal surfaces forming an uninterrupted extension of said ramp surface, and said cam follower means having a portion for alternately riding on all said surfaces, first power means for reciprocating said carriage horizontally, and second power means for reciprocating said beam means horizontally.

2. The conveyor as claimed in claim 1 in which actuation of said first power means in one sense moves said carriage horizontally forward to raise said beam means vertically to thereby raise the workpieces while said cam follower means rides on said ramp surface, said cam follower means further riding on one of said horizontal surfaces at the end of the forward motion of said carriage, subsequent actuation of said second power means in one sense moves said beam means horizontally forward to move said workpieces horizontally forward while said follower means rides on said one horizontal surface, subsequent actuation of said first power means in a reverse sense retracts said carriage to lower said beam means to thereby lower the workpieces on to said support means while said follower means rides on said ramp surface, said follower means further riding on the other of said horizontal surfaces at the end of the retracting motion of said carriage, and subsequent actuation of said second power means in a reverse sense moves said beam means horizontally rearward while said follower means rides on said other horizontal surface.

3. The conveyor as claimed in claim 2 in which said cam means is connected to said beam means and said cam follower means is connected to said carriage.

4. The conveyor as claimed in claim 3 in which said cam follower means includes roller means riding on said surfaces.

5. The conveyor as claimed in claim 4 in which said carriage has wheels riding on horizontal tracks under and parallel to said beam means.

6. The conveyor as claimed in claim 5 in which said power means each comprises a fluid cylinder having an extensible piston.

7. In a heat treat furnace, a reciprocating conveyor for conveying hot articles through a heating zone having entrance and exit ends, comprising elongated fixed refractory support means having an upper surface projecting through the entrance end of said zone and extending through said zone to the exit end thereof, a movable refractory beam substantially longitudinally coextensive with said fixed support member and having an upper surface parallel to and closely spaced from the surface of said support means, the upper surfaces of both said support means and said beam having serrations therein which serrations register vertically with one another at a plurality of longitudinally displaced positions of said movable beam, a longitudinally movable carriage underlying said beam exteriorly of said heating zone and displaceable longitudinally relative to said beam, cam means and follower means interposed between said beam and said carriage providing a coupling therebetween, said cam means each having spaced horizontal end portions joined by an inclined central portion, the registering serrations of both said support means and said beam being adapted to retain articles to be heat treated thereon, the displacement of said carriage in one direction relatively moving the cam central portions and said followers to elevate the articles from the support means on said beam, the movement of the beam in a first direction relatively moving one of the cam end portions and said followers to displace the articles on the beam toward the exit end of said heating zone, the displacement of said carriage in the opposite direction relatively moving the cam central portions and said followers to lower said articles onto the support means, and the movement of the beam in the opposite direction relatively moving the other of the cam end portions and said followers to displace the beam alone toward the entrance end of said zone.

References Cited

UNITED STATES PATENTS

| 1,965,868 | 7/1934 | Vickers | 198—219 |
| 2,315,205 | 3/1943 | Herold | 198—219 |
| 3,075,635 | 1/1963 | Ruppe | 198—219 |
| 3,193,088 | 7/1965 | White | 198—219 |
| 3,265,187 | 8/1966 | Hein | 198—107 |
| 3,373,979 | 6/1966 | Hammond | 263—6 |

FOREIGN PATENTS 519,025   3/1940   Great Britain.

EVON C. BLUNK, Primary Examiner

A. N. GOODMAN, Assistant Examiner

U.S. Cl. X.R.

263—6